July 18, 1961 T. E. BAKER 2,992,478
AXLE PULLING TOOL
Filed Jan. 26, 1959

INVENTOR.
*Thomas E. Baker.*
BY
*Wm. H. Atkinson*
ATTORNEY

United States Patent Office 2,992,478
Patented July 18, 1961

2,992,478
AXLE PULLING TOOL
Thomas E. Baker, 306 Capitola Road, Capitola, Calif.
Filed Jan. 26, 1959, Ser. No. 788,826
3 Claims. (Cl. 29—259)

My present invention relates to an automobile repair tool and more particularly to a device for pulling the shaft of an automobile rear axle in a practical and effective manner and it has for an object the provision of a device operating in a manner similar to that of a conventional wheel pulling device but with modifications that render such a device adapted to the pulling of the rear axle of an automobile as when undergoing repair.

Another object of the invention is to provide an adapter by which a conventional wheel or gear pulling tool may be used to withdraw an automobile shaft from the rear axle housing.

At the present time there is available a so-called shaft pulling tool which has a weight slidably mounted upon a guide that is secred in axial alignment at the end of the shaft and operates by sliding said weight along the guide and into striking contact with an abutment at the end of the guide. In this operation the weight is manually reciprocated so that in striking said abutment there is exerted an outward pulling force upon the shaft. This operation, however, requires considerable effort on the part of the operator in manipulating the sliding weight and is time consuming. It is, therefore, a further object of my invention to provide a device which may be employed for the removal of a dry shaft in a more efficient manner.

Other objects and advantages of the invention will be in part evident to those skilled in the art and in part pointed out hereinafter in connection with the accompanying drawings wherein there is shown by way of illustration and not of limitation preferred embodiments of the invention.

For a better understanding reference should be had to the accompanying drawing wherein there is shown by way of illustration and not of limitation preferred embodiments of the invention.

In the drawing wherein like numerals refer to like parts through the several views.

Figure 1:
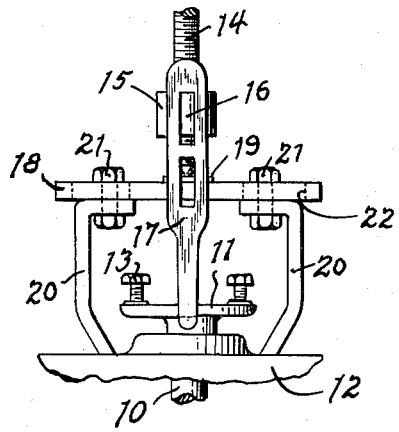
FIGURE 1 shows my device as operating in conjunction with a conventional wheel pulling device for the removal of an automobile drive shaft having a wheel supported flange.
Figure 2:
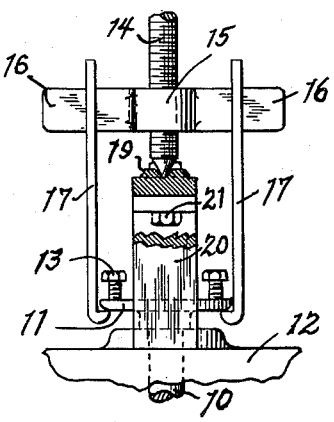
FIGURE 2 is a side view of the device shown in FIGURE 1 with parts broken away and in section to reveal details of construction.

In FIGURES 1 and 2 of the drawing I have shown my device in its simplest form as in positon for the pulling of a shaft 10 with a wheel supported flange 11, from a housing 12 within which the shaft 10 is mounted upon suitable bearings. In this particular arrangement when found in an automobile the flange 11 carries securing bolts 13 by which the hub of a wheel (not shown) is secured to the end of the shaft 10. While the tension or thrust exerting device employed may take many forms, I have here shown such a device as comprised of a thrust screw 14 which carries a threaded yoke or cross-head 15 having oppositely extending arms 16. In this showing, and depending from the arms 16 of the yoke 15 there are two links 17 by which tension is applied to the flange 11 of the shaft 10 by a turning of the screw 14. Under normal operating conditions in pulling a wheel from an automobile shaft, the thrust exerting screw 14 is placed into engagement with the end of the shaft so that as the screw 14 is operated a relative displacement between the wheel and the shaft will result. This would be the normal operation of my device as so far described.

When it is desired to use the above device for the pulling of a shaft from a supporting differential housing as is found at the rear axle of present day automobiles, the pulling of a shaft in the manner contemplated requires a reversal in the above described mode of operation and to accomplish this my invention contemplates the employment of an adapted which, as here shown, consists of a bridging member 18 having a screw accommodating thrust pad 19 intermediate its ends and two oppositely disposed downwardly extending legs 20 which when brought into engagement with the differential housing adjacent the shart 10, in the manner shown, will center the thrust screw 14 substantially in axial alignment with the shatt 10 so that when the screw 14 is turned, thrust against the thrust pad 19 upon the bridging member 18 will place the links 17 under tension and exert a pulling force upon the flange 11 of the shaft 10 while a pushing force or thrust is imposed upon the differential housing 12. In this showing it will be noted that the legs 20 are secured at the ends of the bridging member 18 bolts 21 that pass through elongated slots 22 in the bridging member and in this manner the spacing of the legs 12 may be adjusted to any required dimension. At the same time it will be also noted that the supports 20 are of dog-leg configuration so that by turning them about the spacing at the points of engagement with the housing 12 may be varied in this manner.

Figure 3:
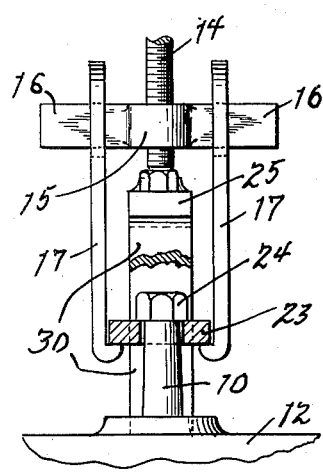
FIGURE 3 is a view similar to FIGURE 2 with the parts broken away and showing details of construction.
Figure 4:
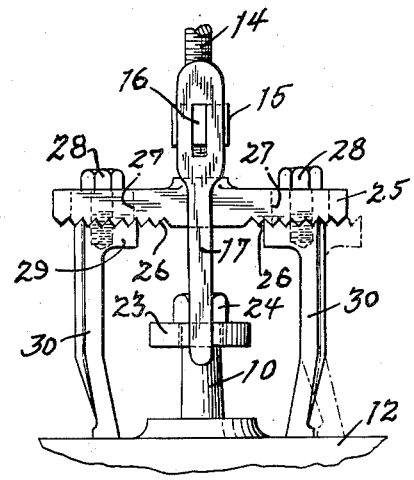
FIGURE 4 is a side view of the device as shown in FIGURE 3 of the drawing.

In FIGURES 3 and 4 of the drawing there is shown a modification of my invention that is particularly adapted to the pulling of a wheel supporting axle without a wheel supporting flange and upon which a wheel is keyed and retained by a threaded nut at the end of the shaft. In this arrangement I have provided a collar 23 that is adapted to be positioned upon the shaft under a retaining nut 24 so that, as here shown, the collar 23 functions in much the same manner as does the flange 11 in the showing of FIGURES 1 and 2.

In this instance my improved device is shown as having a cast steel or drop-forged bridging member 25 having a serrated surface 26 on the underside of its ends and within the range of slots 27 through which securing bolts 28 extend. These bolts 28 are threaded into serrated shoulder forming portions 29 of legs or supports 30 that are likewise of cast steel or drop-forged construction.

With this device the operation is substantially similar to that described above and with a conventional wheel pulling device including the thrust exerted screw 14, the cross-head or yoke 15 and the tension links 17 it is possible to exert a pulling force upon the shaft 10 by the employment of the collar 23.

While I have, for the sake of clearness and in order to disclose my invention so that the same can be readily understood, described and illustrated specific forms and arrangements, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention what I claim and desire to secure by Letters Patent is:

1. A tool for extracting from an axle housing an elongated axle which extends beyond the axle housing and which axle includes an annular flange or the like adjacent the terminal end thereof, end tool comprising an elongated cross head, a thrust screw threadedly mounted in said cross head normal to the longitudinal axis thereof, a pair of pulling links depending from opposite ends of said cross head and adjustable longitudinally along the longitudinal axis thereof, said pulling links having lateral, lower, inwardly directed hook portions for engaging beneath the annular flange or the like, and a separate, inverted U-shaped bridging member positioned between said pulling links and beneath and in angular relationship to said cross head, said bridging member having an intermediate pressure pad portion alignable axially with the terminal end of said thrust screw for axial alignment with the axle to be pulled, said bridging member including a pair of depending legs at opposite ends thereof, the lower ends of said legs converging toward each other for engaging the axle housing behind said annular flange or the like, and mounting means on said bridging member and said depending legs, adjustably mounting said depending legs for movement toward and away from each other with respect to said pressure pad and permitting said legs to be rotated about the longitudinal axis thereof, said converging lower ends of said depending legs extending a greater distance from said cross head than said hook members.

2. The structure of claim 1; said mounting means comprising a pair of lateral abutment portions on the upper ends of said legs juxtaposed beneath said bridging member, a pair of longitudinally disposed slots in opposite ends of said bridging member overlying said lateral abutment portions, and fastening elements disposed in said slots and engaged in said abutment portions.

3. The structure of claim 2; said bridging member and lateral abutment portions of said legs including juxtaposed, intermeshed friction increasing portions for retaining the adjusted position of said legs on said bridging member.

References Cited in the file of this patent

UNITED STATES PATENTS

| | | |
|---|---|---|
| 620,366 | Salenius | Feb. 28, 1899 |
| 1,595,246 | Bagsdale | Aug. 10, 1926 |
| 2,375,391 | Smith | May 8, 1945 |
| 2,465,011 | Culliton | Mar. 22, 1949 |
| 2,650,419 | Barbisch | Sept. 1, 1953 |
| 2,677,174 | Lee | May 4, 1954 |
| 2,715,261 | Williams | Aug. 16, 1955 |
| 2,789,343 | Millsap | Apr. 23, 1957 |

FOREIGN PATENTS

| | | |
|---|---|---|
| 578,529 | Germany | June 15, 1933 |